United States Patent
Yu et al.

(10) Patent No.: US 12,556,342 B2
(45) Date of Patent: Feb. 17, 2026

(54) METHODS AND APPARATUSES FOR HARQ CODEBOOK CONSTRUCTION

(71) Applicant: Hannibal IP LLC, Frisco, TX (US)

(72) Inventors: Chia-Hao Yu, Yilan (TW); Yu-Hsin Cheng, Hsinchu (TW); Hung-Chen Chen, Hsinchu (TW); Yung-Lan Tseng, Hsinchu (TW); Mei-Ju Shih, Hsinchu (TW)

(73) Assignee: Hannibal IP LLC

( * ) Notice: Subject to any disclaimer, the term of this patent is extended or adjusted under 35 U.S.C. 154(b) by 298 days.

(21) Appl. No.: 17/642,984

(22) PCT Filed: Sep. 30, 2020

(86) PCT No.: PCT/CN2020/119518
§ 371 (c)(1),
(2) Date: Mar. 15, 2022

(87) PCT Pub. No.: WO2021/063405
PCT Pub. Date: Apr. 8, 2021

(65) Prior Publication Data
US 2022/0321308 A1    Oct. 6, 2022

Related U.S. Application Data

(60) Provisional application No. 62/909,948, filed on Oct. 3, 2019.

(51) Int. Cl.
*H04L 5/00* (2006.01)
*H04L 1/1607* (2023.01)
*H04L 1/1812* (2023.01)

(52) U.S. Cl.
CPC .......... *H04L 5/0055* (2013.01); *H04L 1/1614* (2013.01); *H04L 1/1812* (2013.01)

(58) Field of Classification Search
CPC ... H04L 5/0055; H04L 1/1614; H04L 1/1812; H04L 1/1864; H04L 5/0053; H04L 1/1861; H04L 5/005
See application file for complete search history.

(56) References Cited

U.S. PATENT DOCUMENTS

| | | |
|---|---|---|
| 2017/0048829 A1 | 2/2017 | Kim et al. |
| 2018/0019843 A1 | 1/2018 | Papasakerrariou |

(Continued)

FOREIGN PATENT DOCUMENTS

| | | |
|---|---|---|
| CN | 104380627 A | 2/2015 |
| CN | 107645774 A | 1/2018 |

(Continued)

OTHER PUBLICATIONS

Extended European Search Report issued on Feb. 23, 2023 for corresponding European Patent Application No. 20870532.7.

(Continued)

*Primary Examiner* — Un C Cho
(74) *Attorney, Agent, or Firm* — Cole Schotz, P.C.; Marcella M. Bodner, Esq.

(57) ABSTRACT

A method, performed by a UE, includes receiving a first Sidelink (SL) Physical Downlink Control Channel (PDCCH) from a Base Station (BS), wherein the first SL PDCCH provides scheduling information for at least one SL transmission; obtaining a value of a SL Assignment Indicator (SAI) field from the first SL PDCCH, wherein the value of the SAI field indicates an accumulative number of a first received SL PDCCHs up to the first SL PDCCH; and constructing a Hybrid Automatic Repeat reQuest (HARQ) codebook for a first quantity of SL transmission (s) scheduled by a second quantity of a second received SL PDCCHs; wherein the HARQ codebook is transmitted to the BS from the UE, the first quantity of the SL transmission (s) includes the at least one SL transmission, the second received SL (Continued)

PDCCHs include the first received SL PDCCHs, and the first received SL PDCCHs include the first SL PDCCH.

14 Claims, 7 Drawing Sheets

(56) References Cited

U.S. PATENT DOCUMENTS

| | | | | |
|---|---|---|---|---|
| 2021/0050953 | A1* | 2/2021 | Park | H04L 1/1819 |
| 2021/0250136 | A1* | 8/2021 | Ye | H04L 1/1861 |
| 2022/0045801 | A1* | 2/2022 | Wang | H04W 72/56 |
| 2022/0103303 | A1* | 3/2022 | Sun | H04L 1/1896 |
| 2022/0279545 | A1* | 9/2022 | Yoshioka | H04W 76/15 |
| 2023/0015997 | A1* | 1/2023 | Liu | H04W 74/0816 |

FOREIGN PATENT DOCUMENTS

| | | |
|---|---|---|
| CN | 114641948 A | 6/2022 |
| EP | 3664338 A1 | 6/2020 |
| EP | 4042595 A1 | 8/2022 |
| IN | 202247005516 | 4/2022 |
| KR | 10-2019-0100509 * | 8/2019 |
| WO | 2019027308 A1 | 2/2019 |
| WO | 2021063405 A1 | 4/2021 |

OTHER PUBLICATIONS

3rd Generation Partnership Project; Technical Specification Group Radio Access Network; Evolved Universal Terrestrial Radio Access; 2015; pp. 1-239; vol. RAN WG1, No. V12.5.0; XP050928106.

Final Examination Report issued by the Indian Patent Office on May 30, 2023, for corresponding Indian Patent Application No. 202247005516.

Ericsson: "On the Support of HARQ/CSI feedbacks Over Sidelink", 3GPP TSG-RAN WG2 #104, 2018, pp. 1-4, Spokane, Washington.

International Preliminary Report on Patentability, issued on Apr. 5, 2022 for corresponding International Patent Application No. PCT/CN2020/119518.

International Search Report, issued on Dec. 31, 2020 for corresponding International Patent Application No. PCT/CN2020/119518.

Written Opinion of the International Searching Authority, issued on Dec. 31, 2020 for corresponding International Patent Application No. PCT/CN2020/119518.

* cited by examiner

METHODS AND APPARATUSES FOR HARQ CODEBOOK CONSTRUCTION

CROSS-REFERENCE TO RELATED APPLICATION(S)

This application is a 371 filing of International Patent Application PCT/CN2020/119518 filed Sep. 30, 2020 and claims priority to U.S. Provisional Application Ser. No. 62/909,948 filed Oct. 3, 2019, both of which are incorporated by reference in its entirety.

FIELD

The present disclosure generally relates to wireless communications, and more particularly, to methods and apparatuses for a Hybrid Automatic Repeat reQuest (HARQ) codebook construction.

BACKGROUND

With the tremendous growth in the number of connected devices and the rapid increase in user/Network (NW) traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability to optimize the NW services and types, accommodating various use cases such as Enhanced Mobile Broadband (eMBB), Massive Machine-Type Communication (mMTC), and Ultra-Reliable and Low-Latency Communication (URLLC).

However, as the demand for radio access continues to increase, there is a need for further improvements of wireless communication for the HARQ codebook construction associated with Sidelink (SL) transmission(s).

SUMMARY

The present disclosure is directed to methods and apparatuses for HARQ codebook construction.

According to an aspect of the present disclosure, a method, performed by a User Equipment (UE) is provided. The method includes receiving a first Sidelink (SL) Physical Downlink Control Channel (PDCCH) from a Base Station (BS), wherein the first SL PDCCH provides scheduling information for at least one SL transmission; obtaining a value of a SL Assignment Indicator (SAI) field from the first SL PDCCH, wherein the value of the SAI field indicates an accumulative number of a first received SL PDCCHs up to the first SL PDCCH; and constructing a Hybrid Automatic Repeat reQuest (HARQ) codebook for a first quantity of SL transmission(s) scheduled by a second quantity of a second received SL PDCCHs; wherein the HARQ codebook is transmitted to the BS from the UE, the first quantity of the SL transmission(s) includes the at least one SL transmission, the second received SL PDCCHs include the first received SL PDCCHs, and the first received SL PDCCHs include the first SL PDCCH.

According to another aspect of the present disclosure, a UE in a wireless communication system including a Base Station (BS) is provided. The UE includes a memory and at least one processor coupled to the memory. The at least one processor is configured to receive a first Sidelink (SL) Physical Downlink Control Channel (PDCCH) from a Base Station (BS), wherein the first SL PDCCH provides scheduling information for at least one SL transmission; obtain a value of a SL Assignment Indicator (SAI) field from the first SL PDCCH, wherein the value of the SAI field indicates an accumulative number of a first received SL PDCCHs up to the first SL PDCCH; and construct a Hybrid Automatic Repeat reQuest (HARQ) codebook for a first quantity of SL transmission(s) scheduled by a second quantity of a second received SL PDCCHs; wherein the HARQ codebook is transmitted to the BS from the UE, the first quantity of the SL transmission(s) includes the at least one SL transmission, the second received SL PDCCHs include the first received SL PDCCHs, and the first received SL PDCCHs include the first SL PDCCH.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DESCRIPTION

Figure 1:
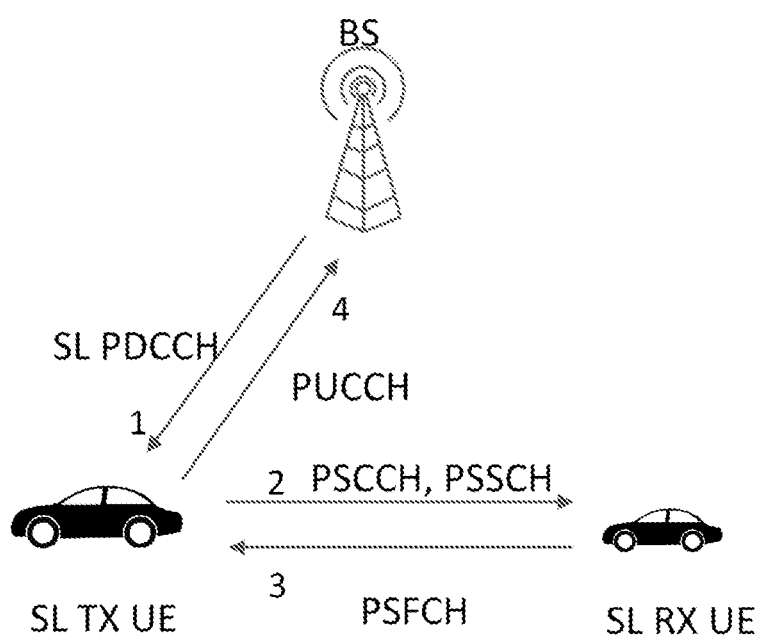
FIG. 1 illustrates a mode-1 transmission system according to an example implementation of the present disclosure.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For consistency and ease of understanding, like features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure so described may include a particular feature, structure, or characteristic, but not every possible implementation of the present disclosure necessarily includes the particular feature, structure, or characteristic. Further, repeated use of the phrase "in one implementation," "in an example implementation," or "an implementation," do not necessarily refer to the same implementation, although they may. Moreover, any use of phrases like "implementations" in connection with "the present disclosure" are never meant to characterize that all implementations of the present disclosure must include the particular feature, structure, or characteristic, and should instead be understood to mean "at least some implementations of the present disclosure" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series, and the equivalent.

The term "and/or" herein is only an association relationship for describing associated objects, and represents that three relationships may exist, for example, A and/or B may represent that: A exists alone, A and B exist at the same time, and B exists alone. "A and/or B and/or C" may represent that at least one of A, B and C exists. In addition, the character "/" used herein generally represents that the former and latter associated objects are in an "or" relationship.

Additionally, for the purpose of non-limiting explanation, specific details, such as functional entities, techniques, protocols, standards, and the like, are set forth for providing an understanding of the described technology. In other examples, a detailed description of well-known methods, technologies, systems, architectures, and the like are omitted so as not to obscure the description with unnecessary details.

Persons skilled in the art will immediately recognize that any NW function(s) or algorithm(s) described in the present disclosure may be implemented by hardware, software, or a combination of software and hardware. Described functions may correspond to modules that may be software, hardware, firmware, or any combination thereof. The software implementation may comprise computer-executable instructions stored on computer-readable media such as memory or other types of storage devices. For example, one or more microprocessors or general-purpose computers with communication processing capability may be programmed with corresponding executable instructions and carry out the described NW function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer-readable medium includes but is not limited to Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication NW architecture (e.g., a Long Term Evolution (LTE) system, an LTE-Advanced (LTE-A) system, or an LTE-Advanced Pro system) typically includes at least one Base Station (BS), at least one UE, and one or more optional NW elements that provide connection towards an NW. The UE communicates with the NW (e.g., a Core NW (CN), an Evolved Packet Core (EPC) NW, an Evolved Universal Terrestrial Radio Access NW (E-UTRAN), a Next-Generation Core (NGC), or an Internet), through a Radio Access NW (RAN) established by the BS.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE is configured to receive and transmit signals over an air interface to one or more cells in a RAN.

A BS may include, but not limited to, a Node B (NB) as in the Universal Mobile Telecommunication System (UMTS), an evolved Node B (eNB) as in the LTE-A, a Radio NW Controller (RNC) as in the UMTS, a Base Station Controller (BSC) as in the Global System for Mobile communications (GSM)/GSM EDGE Radio Access NW (GERAN), a Next Generation eNB (ng-eNB) as in an E-UTRA BS in connection with the 5GC, a next-generation Node B (gNB) as in the 5G Access NW (5G-AN), and any other apparatus capable of controlling radio communication and managing radio resources within a cell. The BS may connect to serve the one or more UEs through a radio interface to the NW.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced LTE (eLTE), NR (often referred to as 5G), and LTE-A Pro. However, the scope of the present disclosure should not be limited to the protocols mentioned above.

The BS may be operable to provide radio coverage to a specific geographical area using a plurality of cells included in the RAN. The BS may support the operations of the cells. Each cell is operable to provide services to at least one UE within its radio coverage. More specifically, each cell (often referred to as a serving cell) may provide services to serve one or more UEs within its radio coverage, (e.g., each cell schedules the Downlink (DL) and optionally UL resources to at least one UE within its radio coverage for DL and optionally uplink (UL) packet transmissions). The BS may communicate with one or more UEs in the radio communication system through the plurality of cells. A cell may allocate sidelink (SL) resources for supporting proximity service (ProSe). Each cell may have overlapped coverage areas with other cells. In Multi-RAT Dual Connectivity (MR-DC) cases, the primary cell of a Master Cell Group (MCG) or a Secondary Cell Group (SCG) may be called as a Special Cell (SpCell). A Primary Cell (PCell) may refer to the SpCell of an MCG. A PSCell may refer to the SpCell of an SCG. MCG refers to a group of serving cells associated with the Master Node (MN), comprising the SpCell and optionally one or more secondary cells (SCells). SCG refers to a group of serving cells associated with the Secondary Node (SN), comprising of the SpCell and optionally one or more SCells.

As discussed above, the frame structure for NR is to support flexible configurations for accommodating various next generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the $3^{rd}$ Generation Partnership Project (3GPP), may serve as a baseline for an NR waveform. The scalable OFDM numerology, such as the adaptive subcarrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or service applications.

Moreover, it is also considered that in a transmission time interval of a single NR frame, at least DL transmission data, a guard period, and UL transmission data should be included, where the respective portions of the DL transmission data, the guard period, the UL transmission data should also be configurable, for example, based on the NW dynamics of NR. Besides, SL resources may also be provided in an NR frame to support ProSe services.

Vehicle-to-everything (V2X) operation can be realized based on different techniques such as Dedicated Short Range Radio (DSRC), 3GPP LTE PC5 Device-to-Device (D2D), 3GPP New Radio SL interface. High-level wise, they can be categorized based on their integration with the cellular network. For example, since both LTE D2D and NR V2X techniques are developed in 3GPP, their interaction and co-existence with cellular communication in a same carrier may be possible. 3GPP-developed V2X technique is also known as Cellular V2X (C-V2X).

For C-V2X techniques, controlling V2X operation (e.g. SL) based on the Uu interface is supported. The Uu interface is the radio interface between mobile terminals and Radio Access Network (RAN). In New Radio (NR) system, resource allocation based on Uu interface signaling is called mode-1 resource allocation. There, SL transmission resources for a transmitter (TX) user equipment (UE) is indicated by a Base Station (BS). Similarly, information for SL reception of a receiver (RX) UE for monitoring SL traffic may also be indicated by BS. In NR V2X, groupcast and unicast transmission may be supported, and they can all be realized by mode-1 resource allocation. Additionally, the Hybrid Automatic Repeat Request (HARQ) operation is supported to improve resource efficiency, compared to blind (re)transmissions. SL HARQ-Acknowledge (ACK) bits are fed back to the BS in order to facilitate further SL retransmission scheduling if needed.

Before introducing the issues, some descriptions and/or terms may be provided hereinafter.

1-step SCI: the counterpart of a Uu DCI in the SL is carried in one PSCCH channel, which includes scheduling information of associated PSSCH(s). The PSCCH is used for sensing purpose.

2-step SCI: the counterpart of the Uu DCI in the SL is separated into two parts. The first part of the SCI includes the scheduling information for the second part of the SCI. The first part of SCI is used for sensing and resource selection purpose.

SL RX UE Identification (ID): In V2X, the SL RX UE ID may be an ID configured by the NAS layer or a Layer-1 ID/Layer-2 ID which may be derived by the NAS-configured ID. For example, the ID configured by the NAS layer may be ProSe (Proximity Service) UE ID. In some other embodiments, the SL RX UE ID may be generated directly in the AS layer (either Layer-1 or Layer-2).

Figure 2:
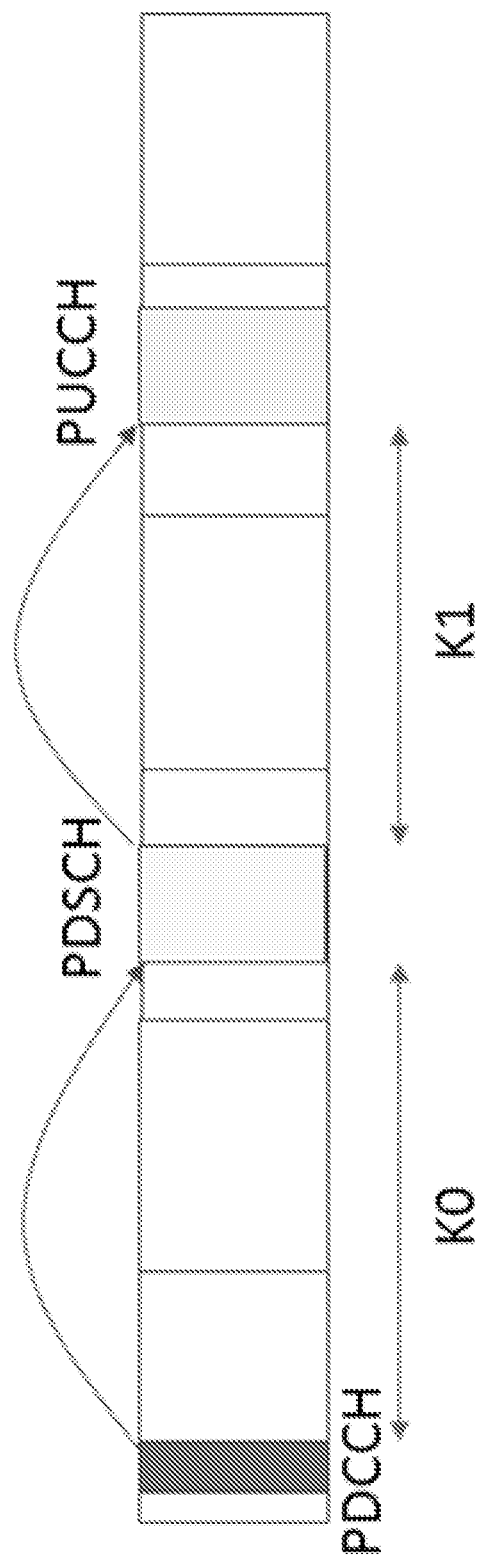
FIG. 2 illustrates a relationship among K0, K1, PDCCH, and PDSCH according to an example implementation of the present disclosure.

Please refer to FIG. 1, which illustrates a mode-1 transmission system 70 according to an example implementation of the present disclosure. In the NR SL resource allocation mode-1, as shown in FIG. 1, SL resources used by a SL transmission UE (simplified as 'SL TX UE' in the following) are scheduled by a SL PDCCH from an associated BS. The resource allocation may include resources for a SL control channel (e.g. Physical SL Control Channel, PSCCH) and/or SL data channel(s) (e.g. Physical SL Shared Channel, PSSCH). The transmission may be unicast, groupcast or broadcast. For mode-1 unicast or groupcast transmission, it is supported for the SL TX UE to report SL HARQ-ACK bits to the BS (e.g., the gNB) via the Uu interface, for indicating successful/failed reception at a SL reception UE(s) and/or SL reception UE group(s) (single or together called 'SL RX UE or SL RX UE(s)' in the following) of previously transmitted transport block(s) (TB(s)). The BS may base on the SL HARQ-ACK feedback to decide the need for retransmission of the TB(s) and provide additional resource allocation. Since the SL HARQ feedback is transmitted via a Uu link, the UE may use a Physical Uplink Control Channel (PUCCH) and/or a Physical Uplink Shared Channel (PUSCH) to transmit the HARQ-ACK bits. Please refer to FIG. 2, which illustrates a relationship among K0, K1, PDCCH, and PDSCH according to an example implementation of the present disclosure. As shown in FIG. 2, there is an embodiment of a HARQ codebook generation procedure (for example, as described in 3GPP TS 38.213 V15.6.0 Section 9.1.2 for semi-static HARQ codebook and Section 9.1.3 for dynamic HARQ codebook), where a HARQ codebook is associated to K0 (e.g., PDSCH-TimeDomainResourceAllocationList) and K1 (e.g., dl-DataToUL-ACK). In one embodiment, as illustrated in FIG. 2, K0 indicates a time offset between a scheduling PDCCH and a scheduled PDSCH corresponding to the scheduling PDCCH. K1 indicates a time offset between a PDSCH and corresponding PUCCH resource for a HARQ-ACK feedback of the PDSCH. DL transmissions associated with PUCCH resource(s) of a same slot may be used to construct a same HARQ codebook for a HARQ-ACK feedback. The mechanism is not directly applicable for the SL HARQ-ACK feedback since the PDCCH for a SL scheduling, denoted by SL PDCCH or SL DCI, may not be associated with SL transmissions via K0 or K1 as it is for the Uu interface.

In some of the embodiments, for NR SL groupcast implementing HARQ-ACK bit feedback, two options are supported.

Option-1 (Non-ACK (NACK)-only): the SL RX UE may transmit a NACK-state on a SL HARQ feedback channel (e.g. Physical SL Feedback Channel, PSFCH) to its corresponding SL TX UE if it fails to decode a TB carried on a PSSCH after decoding an associated PSCCH. It may transmit no signal on the PSFCH otherwise.

Option-2 (ACK/NACK): the SL RX UE may transmit an ACK-state on the PSFCH to its corresponding SL TX UE if it successfully decodes a TB carried on a PSSCH after decoding an associated PSCCH. It may transmit a NACK-state on the PSFCH if it does not successfully decode the TB after decoding the associated PSCCH which targets the SL RX UE.

In one embodiment, for the NACK-only option, in a case of the groupcast, all or a subset of SL RX UE may share the same PSFCH resource for the HARQ-NACK feedback. For the ACK/NACK option, in a case of the groupcast, individual SL RX UE may use individual PSFCHs for feedback. In another embodiment, for an ACK/NACK-based groupcast, all or a subset of SL RX UE may share one PSFCH for an ACK transmission and another PSFCH for a NACK transmission.

In some of the embodiments, the application of the HARQ-ACK feedback may be configured. If the HARQ-ACK feedback is not enabled by configuration, the HARQ-ACK feedback is not transmitted irrespective of the receiving status of the TB. Transmitting the HARQ-ACK feedback or not may be determined by the SL RX UE based on its distance from a corresponding SL TX UE. In such distance-based HARQ-ACK feedback mechanism, the SL RX UE may transmit the SL HARQ feedback for an associated PSCCH or PSSCH if the distance between the SL TX UE and the SL RX UE is smaller than or equal to a communication range requirement. Otherwise, the SL RX UE may not transmit the SL HARQ feedback for the PSCCH/PSSCH. The communication range requirement may be indicated by the BS or pre-defined, which is not limited to hereinafter.

It is noted that while it may assume the availability of some scheduling information in the above description, it may not necessarily assume that they all come from the BS. For example, the SL HARQ feedback option and/or distance requirement in distance-based feedback may be decided by the SL TX UE (or a lead UE in a group) based on, e.g., SL channel information, and report the decision to the corresponding BS. Accordingly, the BS may need to provide proper resources, e.g. the PSFCH and/or PUCCH, for the SL TX UE (or the lead UE).

A few issues on the HARQ-ACK feedback for Uu-controlled SL groupcast resource allocation are to be addressed in this document. First, how the SL TX UE translates received SL HARQ-ACK bits into information for Uu interface feedback when, for example, no signal is received from all SL RX UE.

Second, SL HARQ codebook construction. After receiving SL HARQ-ACK bits from the SL RX UE, how the SL TX UE consolidates and multiplexes/orders the received HARQ-ACK bits for Uu interface feedback on, for example, PUCCH.

Third, DL/SL HARQ-ACK codebook multiplexing. When the SL TX UE has DL HARQ-ACK bits and consolidated SL HARQ-ACK bits ready, how the SL TX UE multiplexes the two types of bits if their corresponding UL resources overlap in a time domain. In general, the issue can be extended to a case of the multiplexing of UCI bits and SL HARQ-ACK bits. Accordingly, the following preferred embodiments are proposed to deal with the above issues.

In some of the embodiments, the SL TX UE may not receive the HARQ-ACK feedback from the SL RX UE when the HARQ-ACK feedback is enabled and SL HARQ-ACK bits generation may be needed for feedback. For example, a channel condition of feedback channels is not good enough so that a HARQ-ACK feedback in SL is lost by the SL TX UE, or a distance-based feedback is enabled and all SL RX UE may be out-of-coverage (OOC). Under such circumstances, the SL TX UE may have no information on which one of the alternatives is the cause. In the mode-1 resource allocation, the crucial thing is for the SL TX UE to provide proper information for the BS, so that the BS may make corresponding scheduling decisions based on the feedback of the SL TX UE.

In one preferred embodiment of the ACK/NACK-based feedback, when the SL TX UE does not detect reception of any PSFCH channel, its HARQ-ACK bit generation for an associated SL transmission(s) is dependent on whether or not the distance-based HARQ-ACK feedback is applied or not. For example, it may feedback NACK on the UL if no signal is received on the PSFCH(s), when not configured for the distance-based feedback for groupcast; alternatively, it may feedback ACK on the UL if no signal is received on the PSFCH(s) when configured for the distance-based feedback for groupcast. In one embodiment, it should be noticeable that the UE does not expect different HARQ-ACK options (i.e., NACK-only and ACK/NACK-based) within a group for groupcasting.

For SL HARQ-ACK codebook construction, two issues are considered. First, the number of HARQ-ACK bits to be included in the codebook for one TB and multiplexing of the HARQ-ACK bits if a number of bits may be more than one. Second, the number of TBs whose HARQ-ACK information may be fed back by the SL TX UE in a UL transmission. In one example, the HARQ-ACK information may include only SL HARQ-ACK bits. In another example, the HARQ-ACK information may include both SL HARQ-ACK and DL HARQ-ACK (HARQ-ACK for DL transmission) bits.

Considering the first issue in the paragraph above, as demonstrated in one embodiment, individual SL RX UE in a groupcast group may occupy individual PSFCH resources for the SL HARQ-ACK feedback, such as the ACK/NACK-based SL HARQ feedback. The SL TX UE may receive as many of HARQ-ACK states as the number of the SL RX UEs in the groupcast group. In another embodiment, a similar issue may happen for the NACK-only feedback where more than one PSFCH resources are used for the HARQ-ACK feedback among the SL RX UEs in a groupcast group.

Figure 3:
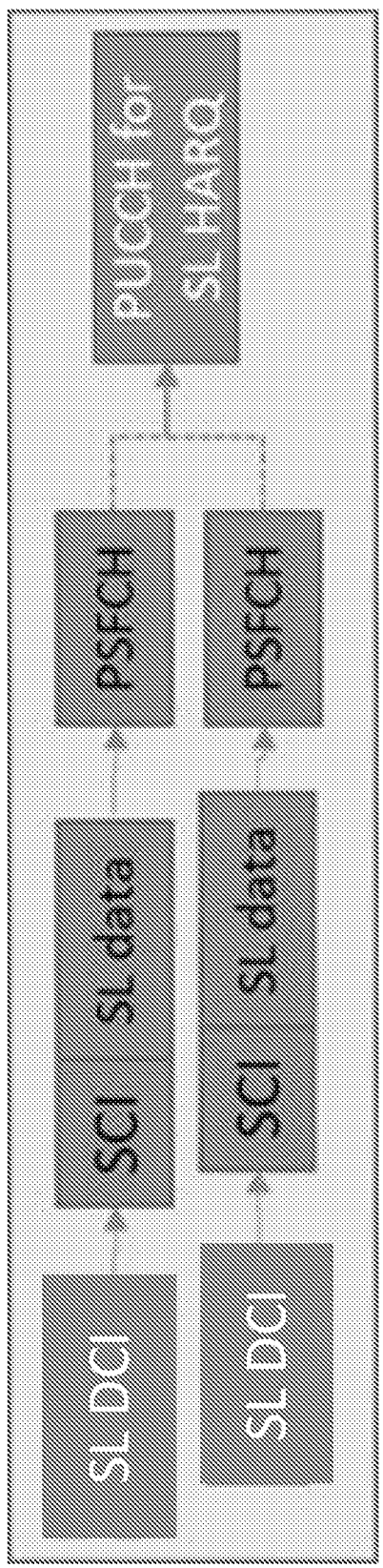
FIG. 3 illustrates multiple SL TB s for the SL HARQ-ACK feedback in one PUCCH according to an example implementation of the present disclosure.

Please refer to FIG. 3, which illustrates multiple SL TBs for the SL HARQ-ACK feedback in one UL slot according to an example implementation of the present disclosure. As shown in FIG. 3, considering the second issue, it may be assumed that more than one SL TBs are scheduled by more than one SL DCI for the same SL TX UE, where each SL PDCCH may be utilized to schedule one or more than one SL transmission(s). Also, the target SL RX UE for the two TBs may or may not be the same. The feedback channels for respective TBs and/or PSFCHs are determined in the way, so that SL HARQ-ACK information of the two SL TBs may be reported via UL resource(s) in the same UL slot. In that, the two PSFCHs are assumed to take place at the same time (i.e. in the same SL slot) but in different frequency resources (for example, different sub-channels), which may occur for the unicast and/or groupcast. It is noted that the figure here is for illustration of the principles only, but not intend to be a constraint. In one embodiment, a SL control information (SCI) in FIG. 3 includes a 2-step SCI. In another embodiment, a SL data in FIG. 3 includes multiple transmissions of a TB. In these varieties, the operation of other parts such as SL DCI, PSFCH, PUCCH for SL HARQ which are very relevant to the discussion in this material is not changed.

Specifically, for the first issue where individual SL RX UE may use individual PSFCHs for the ACK/NACK-based feedback in response to a groupcast transmission, there are two solutions proposed. In some of the embodiments, the first solution may be the consolidation of HARQ-ACK bits from the SL RX UE within the group with the following embodiments. In one embodiment, it may include all individual ACK/NACK bits for individual SL TX UE-RX UE pairs in the HARQ codebook. That is, there is no consolidation. All received ACK/NACK bits corresponding to the same groupcast TB are included as the SL HARQ-ACK information by the SL TX UE. For the multiplexing of individual ACK/NACK bits, in one embodiment, an ACK/NACK bit(s) corresponding to a PSFCH with a lower starting frequency-domain resource index (e.g., sub-channel index) is multiplexed earlier.

The second solution, in another embodiment, may aggregate ACK/NACK bits for each SL TX UE by, for example, bundling across the SL RX UE. In that, only one HARQ-ACK bit is included in the SL HARQ-ACK information, which is eventually considered and/or used for the Uu link reporting, for each groupcast TB. In another embodiment, an ACK bit is generated if the received feedback from all PSFCHs is ACK; otherwise, a NACK bit is generated.

Noticeably, it may be adaptive for the aforementioned solutions that whether or not to perform consolidation is configurable by the BS.

Again, for the second issue, the SL HARQ-ACK information related to multiple TBs is to be consolidated, multiplexed and/or ordered for feedback by using UL resource(s). That is, the ordering is performed between SL HARQ-ACK information in the resolution of the TBs, and such method(s) for the TB-level SL HARQ-ACK information ordering may follow one or a combination in the following three solutions.

The first solution, considering a direct indication in scheduling SL DCI, in one embodiment, may be that a SL Assignment Indicator (SAI) field (e.g., in the scheduling DCI through the SL PDCCH) has similar operations of a Uu interface DAI, which may be understood in, for example, 3GPP TS 38.213 V15.6.0. It is assumed that the UE may be configured to receive a first SL PDCCH from the BS, and the SL PDCCH may provide the UE (generally known as the SL TX UE) scheduling information for at least one SL transmission. Under such circumstances, the SAI field may count only the at least one SL transmission.

In one embodiment, the UE may obtain a value of the SAI field from the first SL PDCCH, where the value of the SAI field is configured to indicate an accumulative number of a first received SL PDCCHs up to the first SL PDCCH. Next, in another embodiment, the UE may construct the HARQ codebook for a first quantity of SL transmission(s) scheduled by a second quantity of a second received SL PDCCHs. In another embodiment, the HARQ codebook may be transmitted to the BS from the UE, the first quantity of the SL transmission(s) may include the at least one SL transmission, the second received SL PDCCHs may include the first received SL PDCCHs, and the first received SL PDCCHs may include the first SL PDCCH. Generally, the at least one SL transmission may correspond to a TB, which is not limited to hereinafter.

In one embodiment, following similar operation of the Uu interface DAI understood from e.g., 3GPP TS 38.213 V15.6.0, may be applied. specifically, the received SL PDCCHs are detected within a set of PDCCH monitoring occasions. The PDDCH monitoring occasions may be SL PDCCH monitoring occasions where PDCCH for scheduling SL traffic is transmitted. The set of PDCCH monitoring occasions may be indicated or configured by the BS to report the SL HARQ-ACK information via the Uu interface. The set of PDCCH monitoring occasions may be confined within a time period, and may have repetitive occurrence, based on the indication from the BS. The set of PDCCH monitoring occasion may be configured to report the SL HARQ-ACK feedback in a same UL slot.

In one embodiment, the at least one SL transmission may determine one bit of the HARQ codebook. Preferably, in another embodiment, the value of the SAI field in the first SL PDCCH may determine an order of the one bit of the HARQ codebook.

Besides, in some of the embodiments, a received SL PDCCH provides resource allocation information for one or more than one transmissions performed by the UE through a SL communication. For example, the UE (i.e. the SL TX UE) may transmit SL traffic provided by the received SL PDCCH to corresponding SL RX UE(s) and/or SL RX UE group(s). The SL RX UE(s) and/or SL RX UE group(s) may be covered by a same BS as the SL TX UE or by another BS, which is not limited to hereinafter. Specifically, in one embodiment, the one bit of the HARQ codebook may represent an ACK/NACK message indicating whether or not the at least one SL transmission is successfully received by the SL RX UE(s) and/or the SL RX UE group(s).

In some of the embodiments, a plurality of bits in the HARQ codebook are processed by a bundling operation and/or a multiplexing operation. In practice, the ordering of SL HARQ-ACK bits representing any SL UE(s) (including SL TX UE, SL RX UE(s) and/or SL RX UE group(s)) may follow a SAI value provided in the SL PDCCH. In one embodiment, one SL HARQ-ACK bit of the SL transmission(s) corresponding to a lower SAI value may be multiplexed earlier.

In another embodiment, the SAI field may include a counting SAI value for providing indexing of the SL transmission(s). In another embodiment, the SAI field may include a total value for providing information on a total number of SL transmission(s) whose SL HARQ-ACK information should be multiplexed together for a Uu feedback.

Figure 4:
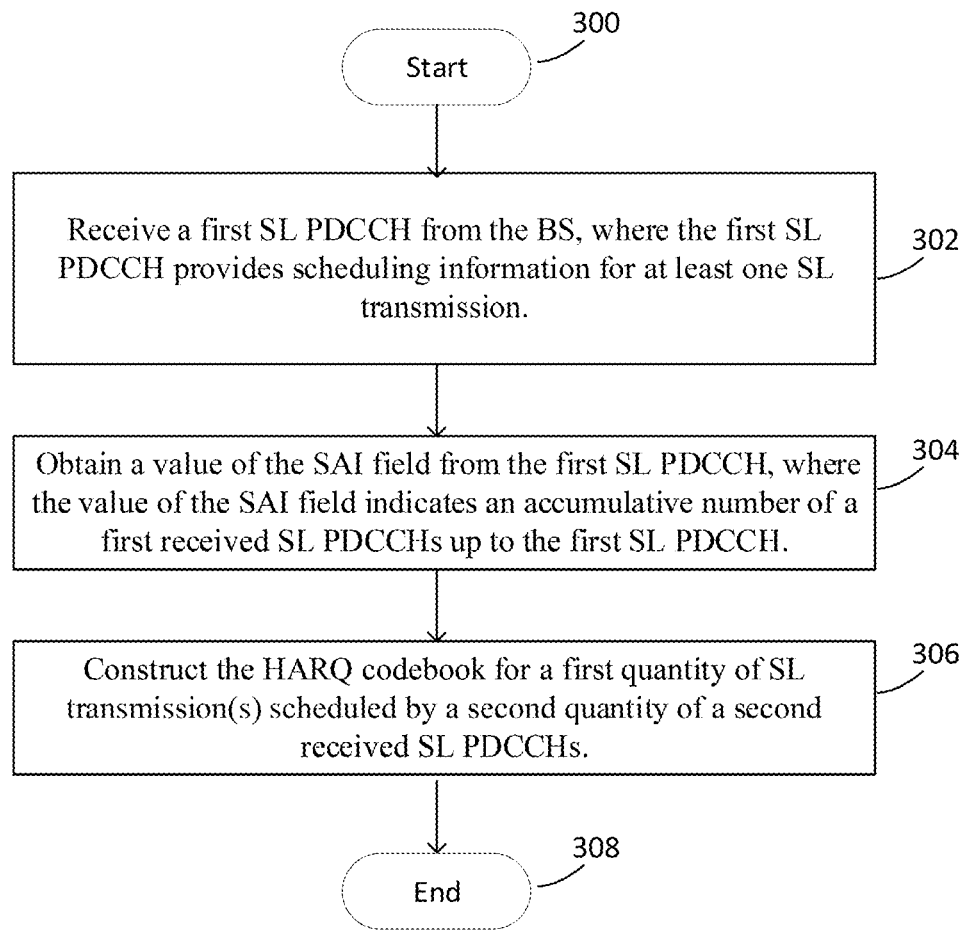
FIG. 4 illustrates a flowchart for a procedure of HARQ codebook construction according to an example implementation of the present disclosure.

Please refer to FIG. 4, which illustrates a flowchart for a procedure 30 of HARQ codebook construction, according to an example implementation of the present disclosure. As shown in FIG. 4, the procedure 30 includes the following steps:

Step 300: Start.

Step 302: Receive a first SL PDCCH from the BS, where the first SL PDCCH provides scheduling information for at least one SL transmission.

Step 304: Obtain a value of the SAI field from the first SL PDCCH, where the value of the SAI field indicates an accumulative number of a first received SL PDCCHs up to the first SL PDCCH.

Step 306: Construct the HARQ codebook for a first quantity of SL transmission(s) scheduled by a second quantity of a second received SL PDCCHs.

Step 308: End.

As illustrated above, the UE (i.e. the SL TX UE) may process the procedure 30 to construct the HARQ codebook, so as to transmit the HARQ codebook (including the SL HARQ-ACK information from the SL RX UE and/or the SL RX UE group(s)) to the BS. Detailed operations of step 302 to step 306 can be understood in the aforementioned paragraphs, which will be neglected hereinafter for brevity.

The second solution, considering multiplexing/ordering of the SL HARQ-ACK information related to multiple TBs, may be an indirect indication in a scheduling SL DCI, and two following methods may be proposed. In the first method, the TB-level HARQ-ACK information ordering may follow the order of monitoring occasions used for the corresponding SL PDCCH transmission. In one embodiment, the HARQ-ACK information for the SL transmission(s) corresponding to an earlier-transmitted monitoring occasion may be multiplexed earlier. It is noted that "monitoring occasion" may follow same definition as detailed in, for example, 3GPP TS 38.213 V15.6.0. A monitoring occasion itself may not distinguish between the Uu DCI and the SL DCI. In other words, a monitoring occasion may be used for the Uu DCI and for the SL DCI. A search space set itself may distinguish between the DCI formats for Uu scheduling as well as the formats for the SL scheduling. A monitoring occasion may include multiple search space sets. The comparison between monitoring occasions may be performed between monitoring occasions that are scheduled by the same type (i.e. the Uu or the SL) of DCIs. In another embodiment, for two search space sets in the same monitoring occasion, the SL HARQ-ACK information corresponding to the set with lower search space index is multiplexed earlier.

In the second method, the TB-level SL HARQ-ACK information ordering may follow the resource index allocated for the PSFCH transmission. For example, the SL HARQ-ACK information, which is related to a PSFCH whose starting sub-channel in the frequency domain is smaller, is multiplexed earlier. In one embodiment, there may be more than one PSFCH associated with a groupcast transmission. Under such circumstances, a specific PSFCH resource may be used. The specific PSFCH may relate to the PSFCH with the lowest starting sub-channel index or the lowest SL RX UE layer-1 ID.

Considering the DL and/or SL HARQ multiplexing, in some of the embodiments, PUCCH resources used for the DL HARQ-ACK feedback and for the SL HARQ-ACK feedback may be indicated by the BS independently. When there are overlapped symbols for the PUCCH resources, a codebook concatenation may be performed. If the codebook concatenation is performed, it is necessary to decide which PUCCH resource is used for a concatenated SL HARQ-ACK feedback while ignoring another PUCCH resource. Additionally, the multiplexing of generic UCI and the SL HARQ-ACK needs further clarification in the following.

For an SR and SL PUCCH format-0/1 reporting for indicating positive or negative SR and up to two SL HARQ bits in either PUCCH format-0 or PUCCH format-1 resource, the following four methods may be proposed when the SR resource and the SL PUCCH format 0/1 resource collide, for example, overlapped symbols in the two resources.

In the first method, in one embodiment, for a PUCCH resource for a positive SR overlapping with a PUCCH format-0 resource for up to two SL HARQ bits, the PUCCH format-0 resource with cyclic shifts based on a predefined table may be applied for transmission. The positive SR information may be carried in the PUCCH format-0 via cyclic shift selection. The predefined table may be the same as for DL HARQ bits transmission defined in, for example, TS 38.213 V15.6.0, which is not limited to hereinafter.

In the second method, in one embodiment, for a negative SR whose PUCCH resource overlapping with a PUCCH format-0 resource for up to two SL HARQ bits, the PUCCH format-0 resource with cyclic shifts based on a predefined table may be applied for transmission. The predefined table may be the same as for DL HARQ bits transmission defined in, for example, TS 38.213 V15.6.0, which is not limited to hereinafter. Noticeably, the predefined table is different from the predefined table for the positive SR and SL PUCCH format-0.

In the third method, in one embodiment, for a positive or negative SR in PUCCCH format-0 overlapping with a PUCCH format-1 resource for up to two SL HARQ bits, SL HARQ bits may be transmitted by using the PUCCH format-1. The SR information may be dropped.

In the fourth method, in one embodiment, for a positive SR in PUCCH format-1 overlapping with SL HARQ bits in PUCCH format-1, the SR PUCCH format-1 resource may be used for SL HARQ bits transmission. In another embodiment, for a negative SR in PUCCH format-1 overlapping with SL HARQ bits in PUCCH format-1, the SL HARQ PUCCH format-1 resource may be used for SL HARQ bits transmission. That is, the SR information is carried by on-off keying of the SR PUCCH format-1 resource.

For DL HARQ bits on PUCCH format-0 or PUCCH format-1 resource overlapping with SL HARQ bits on another PUCCH format-0 or PUCCH format-1 resource, two solutions may be proposed.

The first solution, in some of the embodiments, is that one of the DL and the SL HARQ PUCCH resources may be selected for transmission. Another PUCCH resource is dropped from transmission. Consolidated HARQ-ACK bits from the DL and the SL are transmitted on the selected PUCCH resource. Which PUCCH resource is selected for transmission may be based on one or a combination of the following three methods.

In the first method, in one embodiment, the PUCCH resource associated with a fixed interface (e.g., the SL interface or the Uu interface) may be used for transmission. The fixed interface may be pre-specified/pre-configured/configured.

In the second method, in one embodiment, the PUCCH resource associated with a certain format is dropped with priority. For example, the PUCCH format-1 may be selected for dropping when the two PUCCH resources correspond to different PUCCH formats.

The third method, in one embodiment, may determine which resource to be dropped based on priority determined by various ways in the following. It is noted that, in one embodiment, the one with lower/lowest priority may be dropped.

The first way, in one embodiment, is that DL HARQ-ACK bits corresponding to high priority DL service (e.g., URLLC traffic) may be distinguishable by corresponding scheduling DCI. The priority may be binary, i.e. low priority and high priority. If such different priorities may be associated with different DL HARQ-ACK bits, the highest priority among them may be assumed.

The second way, in one embodiment, is that a priority of SL HARQ-ACK bits may be determined based on an explicit priority field in a corresponding SCI. If such different priorities may be associated with different SL HARQ-ACK bits, the highest priority among them may be assumed.

The third way, in one embodiment, is that, for a DL HARQ-ACK information corresponding to a high priority indication via the DCI, the DL HARQ-ACK codebook may be transmitted on its (for DL) PUCCH resource. Accordingly, the SL HARQ-ACK bits may be dropped.

The fourth way, in one embodiment, is that there may be a priority threshold for an SCI priority field. For a DL HARQ-ACK information corresponding to a low priority indication via the DCI, the DL HARQ-ACK codebook may be transmitted on its (for DL) PUCCH resource if the SCI priority field associated with SL HARQ-ACK bits indicates a priority lower than the priority threshold. Accordingly, the SL HARQ-ACK bits may be dropped. In another embodiment, for a DL HARQ-ACK information corresponding to a low priority indication via the DCI, the SL HARQ-ACK codebook may be transmitted on its (for SL) PUCCH resource if the SCI priority field associated with SL HARQ-ACK bits indicates a priority higher or equal to the priority threshold. Accordingly, the SL HARQ-ACK bits may be dropped.

The second solution is that, in some of the embodiments, the determination of consolidated HARQ-ACK bits may be based on the following two methods. The first method, in one embodiment, is that HARQ-ACK bits from one interface (DL or SL) may be selected for dropping if neither of the PUCCH resources may accommodate all DL and SL HARQ-ACK bits. The selection may be based on the first solution for selecting the PUCCH resource mentioned above. The second method, in another embodiment, is that if a payload size after concatenation can fit the PUCCH format-0/1 resource, all DL/SL HARQ-ACK bits may be consolidated for transmission on a selected PUCCH resource.

If a long format PUCCH for the UCI and a short format PUCCH for the SL HARQ-ACK collide, or the short format PUCCH for the UCI and the long format PUCCH for the SL HARQ-ACK collide, the long format PUCCH may be selected for multiplexing the UCI and the SL HARQ-ACK. In one embodiment, if a PUCCH format-2/3/4 for the UCI and PUCCH format-0/1 for SL HARQ collide, the PUCCH format-2/3/4 may be selected for transmitting multiplexed UCI and SL HARQ-ACK bits.

In another embodiment, for the case of overlapping PUCCH resources of a positive or negative SR, DL HARQ bits, and SL HARQ bits, the solutions may be applied for consolidating such HARQ bits first. Then, the SR and HARQ-ACK bits multiplexing may be applied. Preferably, the SR and HARQ-ACK bit multiplexing method(s) may be found in, for example, TS 38.213 V15.6.0 or other similar solutions described in this disclosure.

In some embodiments, the payload, which may include the UCI and the SL HARQ-ACK bits, generated based on the solutions proposed above may be multiplexed on the PUSCH if the determined PUCCH resource based on the above solutions overlaps with the PUSCH transmission.

In some of the embodiments, it is noted that the SL TX UE may not be capable of transmission on the UL and the SL simultaneously. Therefore, transmitting {PUCCH and/or PUSCH} and {PSCCH or PSSCH or PSFCH} at the same time may not be allowed. Accordingly, transmission from one interface may be prioritized over the other one. The principles provided here or in the following may both be applied for selecting one channel for transmission.

As previously mentioned, providing the SL HARQ-ACK bits feedback via the UL resources requires additional handling other than the normal Uu interface operation. Accordingly, other relevant solutions are proposed to solve the issues in the following.

In some of the embodiments, the SL TX UE may not receive the HARQ-ACK feedback from the SL RX UE(s) when the SL HARQ-ACK feedback is enabled. For example, the reasons may be that a channel condition of feedback channels is not good enough so that a HARQ-ACK feedback in SL is lost by the SL TX UE, or the distance-based feedback is enabled and all SL RX UEs may be out-of-coverage (OOC) away from the SL TX UE. The SL TX UE has no information about which one of the reasons has occurred. In the mode-1 resource allocation, the crucial thing is for the SL TX UE to provide proper information to the BS, so that the BS may make corresponding scheduling decisions based on the feedback of the SL TX UE. Such a DTX issue may be also encountered for unicast if the distance-based HARQ-ACK operation is applied.

In one embodiment, for the ACK/NACK-based feedback, when the SL TX UE does not detect reception of any PSFCH channel, its HARQ-ACK bit generation for an associated SL transmission(s) is dependent on whether or not the distance-based HARQ-ACK feedback is applied as detailed below. This is because when the distance-based feedback is not assumed, the BS should take care of the possibility that the SL PSCCH/PSSCH is not received by the SL RX UE(s), and thus, a retransmission should be considered. In one implementation, a NACK indication is generated if no signal is received on the PSFCH, when not configured for the distance-based feedback for groupcast and/or unicast. In another implementation, an ACK indication is generated if no signal is received on the PSFCH, when configured for the distance-based feedback for groupcast and/or unicast. Certainly, it should be noticeable that UE does not expect different HARQ-ACK options (i.e., the NACK-only and the ACK/NACK-based) within a group for groupcasting.

In some of the embodiments, for the gNB to learn the full picture on SL ACK/NACK states, one more feedback state, i.e. the DTX, is introduced for informing that no signal has been received by the SL TX UE. In one embodiment for a NACK-only feedback, the DTX may be transmitted on the UL if no signal is received on the PSFCH, when not configured for the distance-based feedback for groupcast and/or unicast. The ACK may be transmitted on the UL if no signal is received on the PSFCH, when configured for the distance-based feedback for groupcast and/or unicast. In one embodiment for an ACK/NACK-based feedback, the DTX may be transmitted on the UL if no signal is received on the PSFCH, when not configured for the distance-based feedback for groupcast and/or unicast. The NACK may be transmitted on the UL if no signal is received on the PSFCH, when configured for the distance-based feedback for groupcast and/or unicast.

Figure 5:
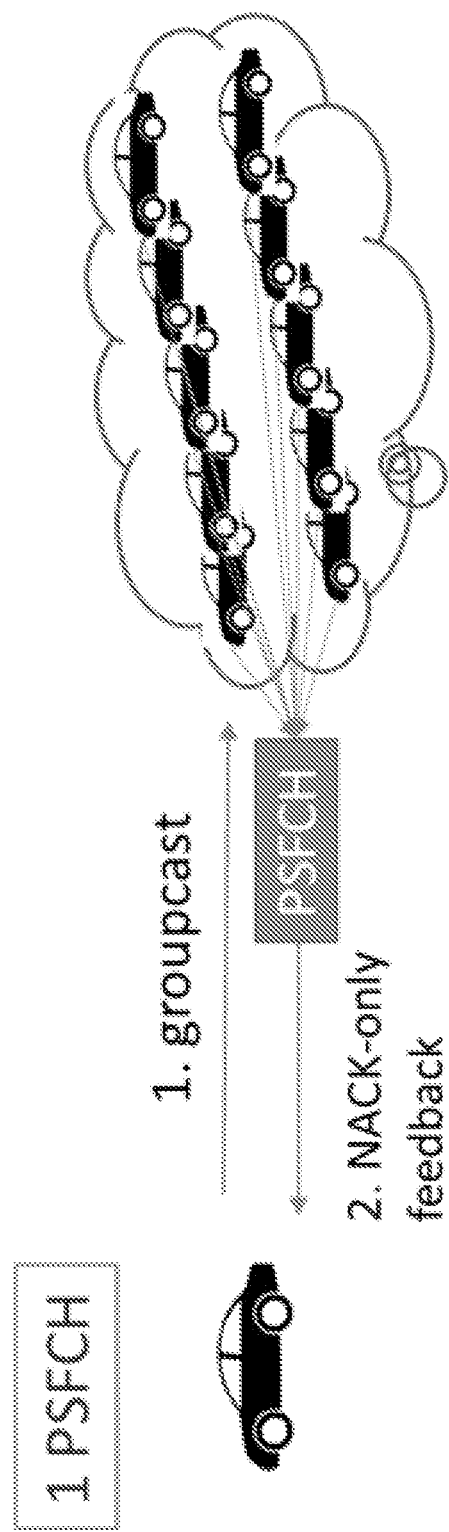
FIG. 5 illustrates one shared PSFCH for the NACK-only feedback in SL groupcasting according to an example implementation of the present disclosure.
Figure 6:
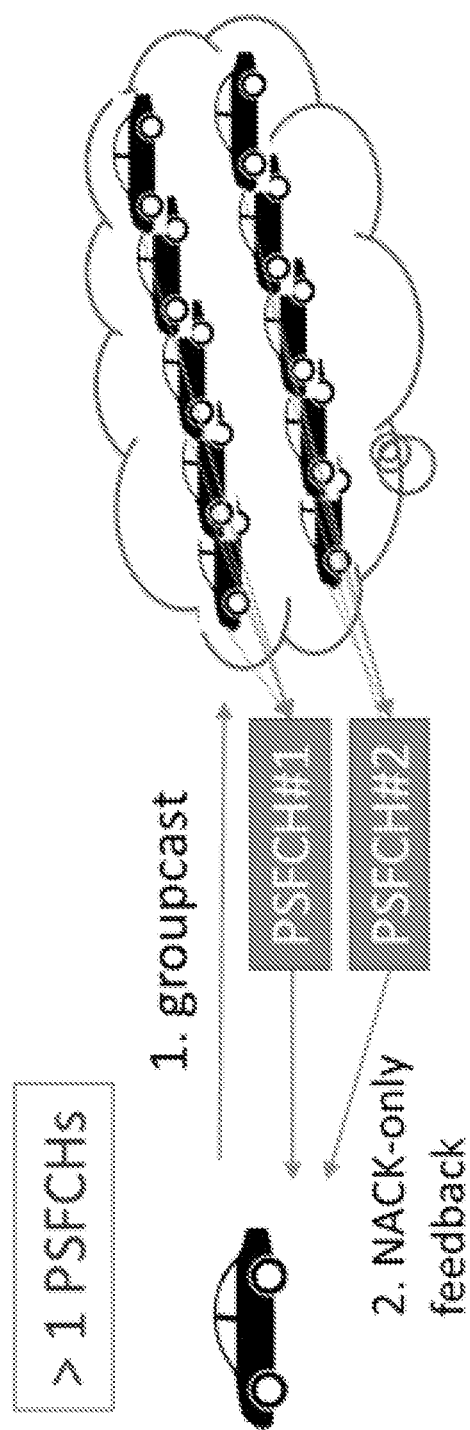
FIG. 6 illustrates two PSFCHs for the NACK-only feedback in SL groupcasting according to an example implementation of the present disclosure.

In some of the embodiments, for the NACK-only feedback in groupcast case, more than one feedback channel (i.e. PSFCHs) may be shared among the SL RX UE(s) within the group. Accordingly, the SL RX UE(s) within the group may be further divided into sub-groups, with each sub-group mapping to one of the more than one PSFCH. Please refer to FIG. 5 and FIG. 6, where FIG. 5 illustrates one shared PSFCH for the NACK-only feedback in SL groupcast according to an example implementation of the present disclosure, and FIG. 6 illustrates two PSFCHs for the NACK-only feedback in SL groupcast according to an example implementation of the present disclosure. As shown in FIG. 5 and FIG. 6, one or two PSFCH resource(s) may be, respectively, used within one SL groupcast group. In FIG. 6, the SL RX UEs are grouped into two, where each sub-group may share one PSFCH for the NACK-only feedback. It is noted that two PSFCHs for the two subgroups may be illustrated hereinafter for demonstration, which is not limited to the scope of the embodiment. In other words, it is straightforward for those skilled in the art to adjust the number of two into other values for the subgroups and to apply the same principle as mentioned above. Preferably, the formation of subgroups may follow different approaches. In one embodiment, it is indicated by the BS via a higher layer signaling. In another embodiment, the subgroup formation is performed by the SL TX UE and the result of the subgroup formation may or may not feedback to the BS. The BS may subsequently configure related resources, including PSFCH resources, if the sub-grouping information is informed. If the BS does not receive the sub-grouping information, the SL TX UE may allocate the assigned number of PSFCH (by the BS) to the subgroups by itself. In another embodiment, the allocation may be based on a pre-specified rule.

In some of the embodiments, when more than one PSFCH may be used for the NACK-only feedback as described above, the SL TX UE may collect and/or generate one ACK/NACK decision for each PSFCH channel (i.e., each sub-group of the SL RX UEs). For the reception of the NACK from the PSFCH, the SL TX UE may decide the NACK state for the corresponding PSFCH channel. When not receiving anything, the SL TX UE may decide the ACK state for the corresponding PSFCH channel. The SL HARQ-ACK report via the Uu interface may be decided further based on the number of PSFCHs and the number HARQ-ACK bits for a groupcast group.

In one embodiment, if a single PSFCH is shared by all SL RX UEs, an ACK indication is generated if no signal is received on the PSFCH; alternatively, a NACK indication is generated if receiving the NACK indication on the PSFCH.

In one embodiment, more than one PSFCH may be shared by all SL RX UEs. If only one consolidated HARQ-ACK bit is transmitted on the UL for a groupcast group, the SL TX UE may transmit an ACK indication on the UL if no signal is received on all PSFCHs, and transmit an NACK indication on the UL if receiving NACK indication from any of the PSFCHs. On the other hand, if one consolidated HARQ-ACK bit is generated for each PSFCH for the UL feedback, the SL TX UE may generate ACK indication if no signal is received on the corresponding PSFCH and generate NACK indication if receiving the NACK indication on the corresponding PSFCH. The generated SL HARQ-ACK bits (i.e., the ACK and NACK indication above) corresponding to individual PSFCHs may be aggregated and ordered for the UL feedback. Specifically, the ordering may be based on a PSFCH resource index (e.g., starting sub-channel index, starting PRB index) and/or Sub-group IDs.

It is noted, in one embodiment, that one consolidated HARQ-ACK bit may be determined based on an ACK ratio. For example, if the SL TX UE determines that the received feedback in the NACK states among all possible reception is larger than a given threshold, the SL TX UE may indicate "NACK" to the BS for such allocation of PSFCH(s); otherwise, the SL TX UE may indicate "ACK" to the BS. In another embodiment, the threshold may be preconfigured/predefined or signaled by the gNB. Noticeably, the determination of the ACK/NACK state may follow the operations and/or mechanisms provided in other embodiments, which is ignored hereinafter for brevity.

Again, for SL HARQ-ACK codebook construction, there are two dimensions to be considered. First, how many HARQ-ACK bits may be needed to be included in the codebook for one TB and how to multiplex them if the number of bits is more than one. Second, how many TBs whose HARQ-ACK information may be fed back by the SL TX UE in the UL transmission.

For the first issue, it may be similar to the illustration of FIG. 6 which is based on the NACK-only option, but it may be extended to the ACK/NACK-based feedback case. For the ACK/NACK-based SL HARQ feedback, each of SL RX UE(s) in a groupcast group may occupy its individual PSFCH resources for the SL HARQ-ACK feedback, and the SL TX UE may receive as many of HARQ-ACK states as the number of the SL RX UE(s) in the groupcast group.

For the second issue, it is assumed that more than one SL TB may be scheduled by more than one SL PDCCH for the same SL TX UE, as illustrated in FIG. 3. The corresponding SL RX UE(s) for the two TBs may or may not be the same. The feedback channels for respective TBs (i.e. the PSFCHs) are determined in a way so that the SL HARQ-ACK information of the two SL TBs is to be reported via the UL resource(s) of the same UL slot. As shown in FIG. 3, the two PSFCHs are assumed to take place at the same time (e.g., in the same SL slot) but in different frequency resources (e.g., in different sub-channels). This scenario may happen for unicast and/or groupcast.

Back to the first issue above, more than one PSFCH resource may be used for the HARQ-ACK information in response to a groupcast transmission and the HARQ-ACK information may correspond to the NACK-only feedback or the ACK/NACK-based feedback.

Specifically, the consolidation of HARQ-ACK bits from the SL RX UE(s) within the same group may include the following three solutions.

The first solution, in one embodiment, is that all individual HARQ-ACK bits for each of the SL TX UE-RX UE pair(s) may be included in the HARQ codebook. That is, there is no consolidation. All received HARQ-ACK bits corresponding to the same groupcast TB are included as the SL HARQ-ACK information by the SL TX UE. For the multiplexing of the individual ACK/NACK bits, it may be based on the PSFCH resource index(es) for receiving the corresponding ACK/NACK bits from the SL RX UE(s), or based on the SL RX UE Id(s) e.g., a layer-1 ID. In another embodiment, an ACK/NACK bit(s) corresponding the PSFCH with the lowest starting frequency-domain resource index (e.g., sub-channel index) may be multiplexed firstly or lastly.

The second solution, in one embodiment, may be the aggregation of the HARQ-ACK bits by, for example, bundling across the SL RX UE(s) or across the PSFCHs. In this case, only one HARQ-ACK bit is included in the SL HARQ-ACK information for each groupcast TB. In another embodiment, the ACK bit is generated if received feedback from all PSFCHs is ACK; otherwise, the NACK bit is generated.

The third solution, in one embodiment, may be the aggregation of the HARQ-ACK bits from the SL RX UE(s) sharing the same PSFCH by, for example, bundling the received bits across the SL RX UE(s). In this case, the ACK/NACK bit is generated for each associated PSFCH resource. Preferably, it may be noticeable that whether or not to perform consolidation in any of the solutions mentioned above is configurable by the BS, which is not limited to hereinafter.

For the second issue above, the HARQ-ACK information related to multiple TBs is to be multiplexed and/or ordered for feedback by using the UL resource. In some of the embodiments, it may focus on the ordering of consolidated SL HARQ-ACK bits in the TB level. That is, the ordering is performed between the HARQ-ACK information in the resolution of the TBs. The HARQ-ACK information ordering within one TB may follow the solution mentioned in the first issue above. Besides, solutions for the TB-level HARQ-ACK information ordering may follow one or a combination of the following seven solutions.

The first solution, in one embodiment, may be based on a direct indication in scheduling SL DCI. In one embodiment, there is a SAI field (e.g. in the scheduling SL PDCCH) whose operation may be similar to the Uu interface DAI, as detailed in, for example, 3GPP TS 38.213 V15.6.0. The SAI field may count only the SL transmission(s), i.e. the accumulative number of the received SL PDCCHs. The ordering of SL HARQ-ACK bits may follow the SAI value provided in scheduling SL PDCCH. For example, in another embodiment, the SL transmission corresponding to the lower SAI value may be multiplexed earlier. SAI field may include a counter SAI value for providing indexing of the scheduled SL transmission. SAI field may include a total SAI value for providing information on the total number of SL transmission(s) whose HARQ-ACK information should be multiplexed together for the Uu feedback until this SL scheduling command for the associated SL TX UE.

In one embodiment, following similar operation of the Uu interface DAI understood from e.g., 3GPP TS 38.213 V15.6.0, may be applied. Specifically, the received SL PDCCHs may be detected within a set of PDCCH monitoring occasions. The PDDCH monitoring occasions may be/include SL PDCCH monitoring occasions where PDCCH for scheduling SL traffic is transmitted. The set of PDCCH monitoring occasions may be indicated or configured by the BS to report the SL HARQ-ACK information via the Uu interface. The set of PDCCH monitoring occasions may be confined within a time period, and may have repetitive occurrence, based on the indication from the BS. The set of PDCCH monitoring occasion may be configured to report the SL HARQ-ACK feedback in a same UL slot.

The second solution, in one embodiment, may be the indirect indication in the scheduling SL DCI, and may include the following four methods. The first method may be based on the SL DCI monitoring occasion order. In one embodiment, the TB-level HARQ-ACK information ordering may follow the order of monitoring occasions used for SL DCI transmission. In one embodiment, the HARQ-ACK information for the SL transmission corresponding to an earlier-transmitted monitoring occasion may be multiplexed earlier. It is noted that "monitoring occasion" may follow the same definition as detailed in, for example, 3GPP TS 38.213 V15.6.0. A monitoring occasion itself may not distinguish between the Uu DCI and the SL DCI. That is, the monitoring occasion may be used for the Uu DCI and for the SL DCI. A search space set itself may distinguish between DCI formats for the Uu scheduling and for the SL scheduling. A monitoring occasion may include multiple search space sets. The comparison between monitoring occasions may be performed between monitoring occasions that may be scheduled by the same type (e.g. the Uu or the SL) of DCIs. In another embodiment, for two search space sets in the same monitoring occasion, the HARQ-ACK information corresponding to the set with the lower search space index is multiplexed earlier.

The second method may be based on the SCI resource order. Specifically, the TB-level HARQ-ACK information ordering may follow the resource index allocated for the PSCCH transmission. In one embodiment, the HARQ-ACK information related to one PSCCH whose transmission time is earlier is multiplexed earlier. In another embodiment, the HARQ-ACK information related to the PSCCH whose starting sub-channel/PRB (i.e. frequency domain resource index) is smaller is multiplexed earlier.

The third method may be based on the PSSCH resource order. Specifically, the TB-level HARQ-ACK information ordering may follow the resource index allocated for PSSCH transmission. In one embodiment, the HARQ-ACK information related to the PSSCH whose transmission time is earlier is multiplexed earlier. The transmission time may relate to a starting symbol in a slot for the PSCCH transmission. The transmission time may relate to the slot number for the PSCCH transmission. In another embodiment, the HARQ-ACK information related to the PSSCH whose starting sub-channel/PRB in the frequency domain is smaller is multiplexed earlier.

The fourth method may be based on the PSFCH frequency resource index. Specifically, the TB-level HARQ-ACK information ordering may follow the resource index allocated for the PSFCH transmission. In one embodiment, the HARQ-ACK information related to the PSFCH whose starting sub-channel in the frequency domain is smaller is multiplexed earlier. In another embodiment, there may be more than one PSFCH associated with the groupcast transmission. Accordingly, one specific PSFCH resource may be used. The specific PSFCH may relate to the PSFCH with the lowest starting sub-channel index or the lowest SL RX UE ID, for example, the layer-1 ID.

The third solution, in one embodiment, may involve performing bundling operation on the HARQ-ACK information. In one embodiment, the bundling is performed among the TBs. For example, when applying the bundling operation to two TBs, and 'AND' operation may be applied so that the payload size of the consolidated HARQ-ACK information is reduced by half. In another embodiment, one TB-pair with the HARQ-ACK states, for example, {ACK, NACK}, may result in one NACK state after the TB-wise bundling. It is noted that there may be other concerns for applying the bundling operation. In one embodiment, two TBs may correspond to different timings (TDM-ed) for applying the bundling operation. In another embodiment, the two TBs may need to be spatially multiplexed TBs for applying the bundling operation.

In one embodiment, carrier aggregation (CA) is performed/configured in the Uu interface and the fourth solution may be applicable for HARQ-ACK information multiplexing/ordering. In one embodiment, the fourth solution involves utilizing CC indices to determine the TB-level HARQ-ACK information ordering, in addition to the methods above which utilize the Uu resource differentiation for HARQ-ACK information ordering. In such cases, the CC index is applied for a given slot/mini-slot. Within the same slot/mini-slot, the solution above is still applicable. In another example, the HARQ-ACK information corresponding to lower-indexed CC is multiplexed earlier.

In one embodiment, carrier aggregation (CA) is performed/configured in the SL interface and the fifth solution may be applicable for HARQ-ACK information multiplexing/ordering. In one embodiment, the fifth solution involves utilizing the CC indices to determine the TB-level HARQ-ACK information ordering, in addition to the methods above which utilize the SL resource differentiation for HARQ-ACK information ordering. In such cases, the CC index is applied for the given slot/mini-slot. Within the same slot/mini-slot, the solution above is still applicable. In another embodiment, the HARQ-ACK information corresponding to lower-indexed CC is multiplexed earlier.

The sixth solution, in one embodiment for a multi-TRP scenario where the SL scheduling information may be received from different Transmission-Reception Points (TRP) in the same slot/mini-slot, is that a higher-layer index may be configured in a control resource set (CORESET) for differentiating the scheduling from different TRPs. The higher-layer index may be included for determining the TB-level HARQ-ACK information ordering for the solution above which is based on the Uu resource differentiation. In another embodiment, the HARQ-ACK information corresponding to the same higher layer index is multiplexed first based on the solution above, before further concatenation based on the higher layer index.

The seventh solution, in one embodiment, is that a DL/UL direction on the Uu interface may include DL/UL operation with a master node (or a master cell group) and the DL/UL operation with a secondary node (or a secondary cell group).

DL/SL HARQ-ACK bits multiplexing is addressed in the following. Two high-level solution may be applied for multiplexing the HARQ-ACK bits from the DL and SL transmission(s). The first solution is the codebook concatenation. In one embodiment, the HARQ-ACK codebook is constructed for the DL as well as for the SL independently, and accordingly, the two codebooks are then concatenated. The second solution is the TDM-ed PUCCHs in one UL slot. In one embodiment, individual PUCCH resources are used for the SL and DL HARQ-ACK feedback. The individual PUCCH resources may be in the same UL slot, but no overlapping symbols are allowed between the individual PUCCH resources.

For concatenation of the DL/SL HARQ-ACK codebook, in some of the embodiments, the PUCCH resources used for the DL HARQ-ACK feedback and for the SL HARQ-ACK feedback may be indicated by the BS independently. When there are overlapped symbols for the PUCCH resources, the codebook concatenation may be performed. If the codebook concatenation is performed, it may be necessary to decide which PUCCH resource is used for concatenated HARQ-ACK information feedback while ignoring the other PUCCH resource. In one embodiment, following the current Uu interface procedure, as detailed in, for example, TS 38.213 V15.6.0, the SR and CSI information may be multiplexed with the DL HARQ-ACK bits. Thus, a generic situation where the UCI is multiplexed with SL HARQ-ACK may be further proposed in the following.

For the UCI and SL HARQ-ACK multiplexing, there are four solutions proposed in the following. The first solution, in one embodiment, is that up to one HARQ-ACK bit per SL TB may be constructed. A short PUCCH format (e.g., format-0 and format-1) may be indicated by the scheduling SL DCI for the SL HARQ-ACK feedback in the following two methods. The first method may be applicable in unicast SL communication. The first method may be applicable to the groupcast ACK/NACK-based feedback if the HARQ-ACK information consolidation is performed as described above. The second method may be applicable to the groupcast NACK-only feedback if there is only one PSFCH per groupcast group or there is the HARQ-ACK information consolidation when there is more than one PSFCH per groupcast group.

The second solution, in one embodiment, is that the number of HARQ-ACK bits per SL TB may correspond to the number of the SL RX UE(s) in a groupcast group. The second solution may be applicable to the groupcast ACK/NACK-based feedback. The second solution may be applicable when long PUCCH formats (i.e. the format-2/3/4) are applied.

In one embodiment, the Uu UCI may be one of (1)CSI, (2)CSI and SR, (3)CSI and DL HARQ, and (4)CSI and DL HARQ and SR. In the third solution, the Uu UCI may be combined with the SL HARQ-ACK codebook for reporting.

In one embodiment, the SL HARQ-ACK may be concatenated with the DL HARQ-ACK codebook first to form the HARQ-ACK bits. Next, the multiplexing among the SR, the concatenated HARQ-ACK bits and the CSI may follow the Uu interface as detailed in, for example, TS 38.213 V15.6.0.

The third solution, in one embodiment for the multiplexing purpose, is that the SR related to the SL may not be differentiated from the DL SR(s). Thus, a standalone SL SR transmission in the Uu interface may follow either PUCCH format-0 or PUCCH format-1.

The fourth solution, in one embodiment, is that the UCI and SL HARQ-ACK may be multiplexed if the UCI does not correspond to a high priority transmission. For example, the UCI may include the DL HARQ-ACK information corresponding to the high priority transmission (e.g., URLLC transmission). When the SL HARQ-ACK is indicated to use the UL resource with overlapping symbols as those used for the high-priority UCI transmission, the SL HARQ-ACK may be dropped.

On the other hand, if the UCI does not correspond to the high-priority transmission, the SL HARQ-ACK and the UCI may be multiplexed based on the following solution. The DL HARQ-ACK bits corresponding to the high priority DL service (e.g., URLLC traffic) may be distinguishable by corresponding scheduling DCI. In one embodiment, a DCI field for explicit indication or a (pre-)specified/(pre-)configured RNTI may be used for scrambling the scheduling DCI. The priority may be binary, i.e. a low priority and a high priority.

Considering the PUCCH resource selection for multiplexing the DL and SL HARQ-ACK transmission, there may be three solutions as proposed in the following.

The first solution, in some of the embodiments, may be the SR and SL PUCCH format-0/1. In that, it may consider for positive or negative SR, and up to two SL HARQ-ACK bits in either PUCCH format-0 or PUCCH format-1 resource.

In one embodiment, the PUCCH resource for positive SR may overlap with the PUCCH format-0 resource for up to two SL HARQ bits, such that the PUCCH format-0 resource with cyclic shifts based on a predefined table may be applied for transmission. The positive SR information may be carried in the PUCCH format-0 via the cyclic shift selection. The predefined table may be the same as for DL HARQ bits transmission defined in, for example, TS 38.213 V15.6.0.

In another embodiment, the negative SR whose PUCCH resource may overlap with the PUCCH format-0 resource for up to two SL HARQ bits, such that the PUCCH format-0 resource with cyclic shifts based on a predefined table may be applied for transmission. The predefined table may be the same as the one for the DL HARQ bits transmission defined in, for example, TS 38.213 V15.6.0. The predefined table is different from the predefined table for the positive SR and SL PUCCH format-O.

Another method, in one embodiment, may have the positive/negative SR in a PUCCCH format-0 resource overlapping with a PUCCH format-1 resource for up to two SL HARQ bits, such that the SL HARQ bits are transmitted by using the PUCCH format-1. The SR information may be dropped.

Another method, in one embodiment, may have the positive SR in a PUCCH format-1 resource overlapping with the SL HARQ bits in a PUCCH format-1 resource, such that the SR PUCCH format-1 resource may be used for the SL HARQ bits transmission. In another embodiment, for the negative SR in the PUCCH format-1 resource overlapping with the SL HARQ bits in the PUCCH format-1 resource, the SL HARQ PUCCH format-1 resource may be used for the SL HARQ bits transmission. That is, the SR information is carried by on-off keying of the SR PUCCH format-1 resource.

The second solution, in some of the embodiments, may have the DL HARQ-ACK bits on a PUCCH format-0/1 resource overlapping with the SL HARQ bits on another PUCCH format-0/1 resource, and two methods for UL feedback may be proposed in the following.

The first method, in one embodiment, is that one of the DL and SL HARQ PUCCH resources may be dropped. The HARQ bits associated with dropped PUCCH resource may not be transmitted, and such dropping may be performed if neither of the PUCCH resources may accommodate all DL and SL HARQ bits.

In one embodiment, it may be predetermined/(pre-)configured which one of DL and SL HARQ-ACK information to be dropped. In one embodiment, it may drop the SL HARQ-ACK information and transmit only the DL HARQ-ACK bits.

In one embodiment, the PUCCH resource associated with a certain format may be dropped with priority. For example, the PUCCH format-1 may be dropped when the two PUCCH resources correspond to different PUCCH formats.

In one embodiment, it may refer to the priority for such dropping. In one implementation, the DL HARQ-ACK bits corresponding to high priority DL service (e.g., URLLC traffic) may be distinguishable by corresponding scheduling DCI. One DCI field for explicit indication or one specified/configured RNTI may be used for scrambling the scheduling DCI. The priority may be binary, i.e. the low priority and the high priority. If different priority is associated with the different DL HARQ-ACK bits, the highest priority among them may be assumed. In another implementation, the priority of SL HARQ-ACK bits may be determined based on an explicit priority field in a corresponding SCI. If the different priority may be associated with different SL HARQ-ACK bits, the highest priority among them may be assumed. In another implementation, the DL HARQ-ACK information corresponding to a high priority indication via the DCI may be transmitted. The DL HARQ-ACK codebook containing the high priority DL HARQ-ACK information may be transmitted on its (for DL) PUCCH resource. The SL HARQ-ACK bits may be dropped. In another implementation, there may be a priority threshold for the SCI priority field. For the DL HARQ-ACK information corresponding to a low priority indication via the DCI, the DL HARQ-ACK codebook may be transmitted on its (for DL) PUCCH resource, if the SCI priority field associated with the SL HARQ-ACK bits indicates a priority lower than the priority threshold. The SL HARQ bits may be dropped. In another example, for the DL HARQ-ACK information corresponding to a low priority indication via the DCI, the SL HARQ-ACK codebook may be transmitted on its (for SL) PUCCH resource, if the SCI priority field associated with SL HARQ-ACK bits indicates a priority higher or equal to the priority threshold.

The second method, in one embodiment, is that if a payload size after concatenation can fit the PUCCH format-0/1 resource, one of the PUCCH resources may be selected for transmitting concatenated HARQ-ACK codebook, and how to select the PUCCH resource may be determined by one or a combination of the following four ways.

The first way, in one embodiment, is that the PUCCH resource associated with a fixed interface may be used for transmission. The fixed interface may be (pre-)specified/(pre-)configured.

The second way, in one embodiment, is that the PUCCH resource associated with a certain format may be selected with priority. For example, the PUCCH format-1 may be selected when the two PUCCH resources correspond to different PUCCH formats.

The third way, in one embodiment, is that the PUCCH resource selection may be based on the priority of corresponding HARQ-ACK bits. Herein, it may apply the same solution mentioned above to determine which one to drop.

The fourth way, in one embodiment, may be to apply the above solutions to deal with the scenario where a long PUCCH format resource for the UCI overlaps with a long PUCCH format resource for the SL HARQ-ACK.

The third solution, in one embodiment, may be applicable for the cases where a long PUCCH format resource for the UCI reporting overlaps with a short PUCCH format resource for the SL HARQ-ACK reporting, or a short PUCCH format resource for the UCI reporting overlaps with a long PUCCH format resource for the SL HARQ-ACK reporting. In such cases, long PUCCH format resource may be selected for multiplexing the UCI and SL HARQ-ACK. In one example, a PUCCH format-2/3/4 resource is used for UCI reporting and a PUCCH format-0/1 resource is used for SL HARQ-ACK reporting. Accordingly, based on the third solution, the PUCCH format-2/3/4 resource may be selected for transmitting the multiplexed UCI and SL HARQ-ACK bits.

In some of the embodiments, respective PUCCH resources of positive/negative SR, DL HARQ bits, and SL HARQ bits overlap. In the fourth solution, the solutions described above may be applied for consolidating HARQ-ACK bits, and may be followed by multiplexing the SR and HARQ-ACK bits. Herein, the solutions may refer to, for example, TS 38.213 V15.6.0 or other operations provided in the disclosure, which is not limited to hereinafter.

PUCCH resources used for the DL HARQ-ACK feedback and for the SL HARQ-ACK feedback may be scheduled by the BS in one UL slot with non-overlapping symbol(s). That is, the TDM-ed PUCCH resources in one UL slot for DL/SL HARQ-ACK feedback, respectively.

It is noticeably that there may be scenarios that the TDM-ed PUCCH resources for the DL/SL HARQ-ACK feedback may be violated, for example, due to latency issues or due to error case in scheduling. Exceptional case handling may need to be specified in the following.

In case of overlapped PUCCH resources indicated for the DL/SL HARQ-ACK feedback, one PUCCH resource and corresponding HARQ-ACK bits may be dropped. Solutions for selecting one PUCCH resource and corresponding HARQ-ACK bits to be dropped may follow one or a combination of the following three solutions.

The first solution, in one embodiment, is that the PUCCH resource associated with a fixed interface may be dropped. The fixed interface may be (pre-)specified/(pre-)configured.

The second solution, in one embodiment, is that the PUCCH resources corresponding to different formats may be associated with different priorities. A format with lower priority is dropped when overlapping with a higher priority format. For example, a PUCCH format-1 resource may be dropped when overlapping with resources of long PUCCH formats.

The third solution, in one embodiment, may determine which one to be dropped based on the priority. There are three methods proposed in the following. The first method, in one embodiment, is that the DL HARQ-ACK bits corresponding to a high priority DL service (e.g., URLLC traffic) may be distinguishable by its scheduling DCI. For example, the DCI field for an explicit indication or a specified/ configured RNTI may be used for scrambling the scheduling DCI. The priority may be binary, i.e. the low priority and the high priority. If different priorities may be associated with different DL HARQ-ACK bits, the highest priority among them may be assumed.

The second method, in another embodiment, is that the priority of SL HARQ-ACK bits may be determined based on an explicit priority field in the corresponding SCI. If different priorities may be associated with different SL HARQ-ACK bits, the highest priority among them may be assumed.

In one embodiment, the DL HARQ-ACK information corresponding to a high priority indication via the DCI may be transmitted on its (for DL) PUCCH resource. The SL HARQ-ACK bits may be dropped.

The third method, in another embodiment, is that there may be a priority threshold for the SCI priority field. For the DL HARQ-ACK information corresponding to a low priority indication via the DCI as in the first method, the DL HARQ-ACK codebook may be transmitted on its (for DL) PUCCH resource if the SCI priority field associated with the SL HARQ bits indicates a priority lower than the priority threshold. The SL HARQ bits may be dropped. In another embodiment, for the DL HARQ-ACK information corresponding to a low priority indication via the DCI, the SL HARQ-ACK codebook may be transmitted on its (for SL) PUCCH resource if the SCI priority field associated with the SL HARQ bits indicates a priority higher or equal to the priority threshold.

Figure 7:
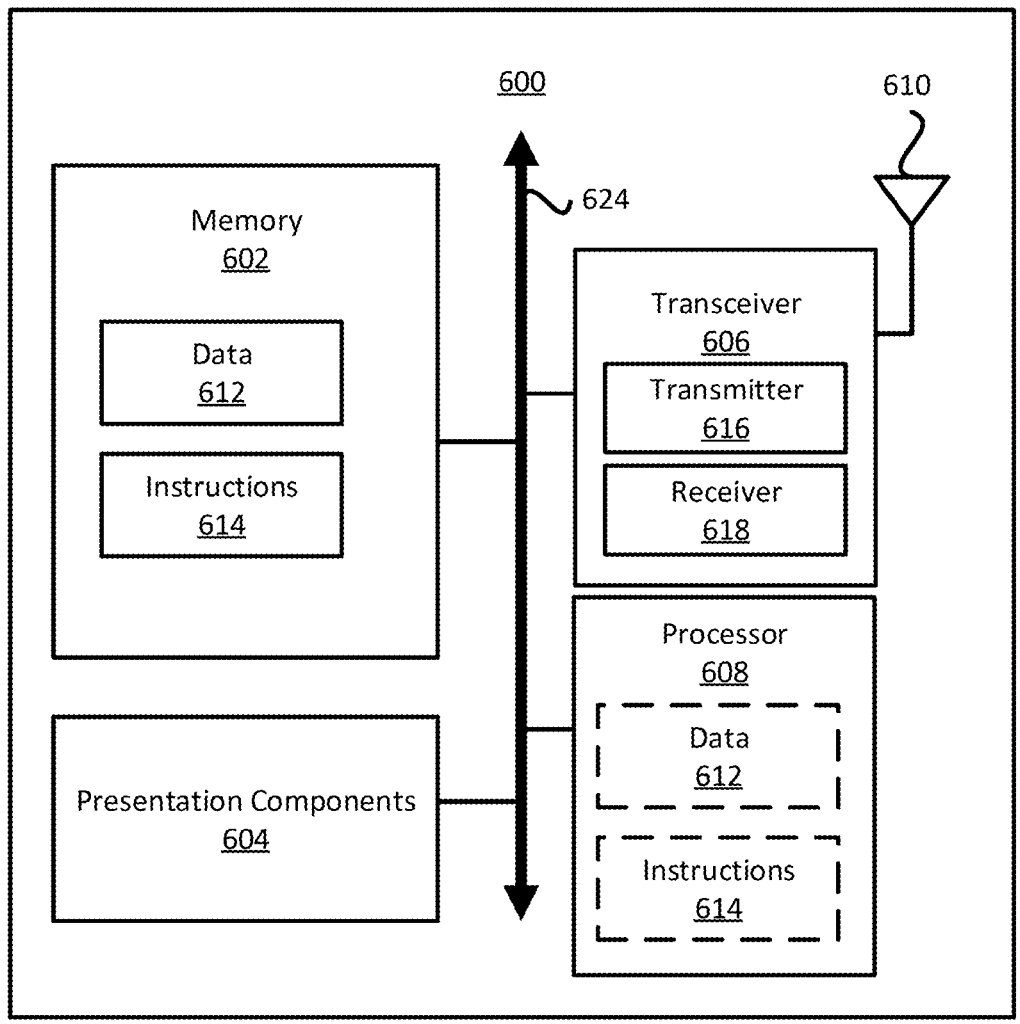
FIG. 7 illustrates a block diagram of a node for wireless communication according to various aspects of the present disclosure.

FIG. 7 illustrates a block diagram of a node 600 for wireless communication according to various aspects of the present disclosure. As illustrated in FIG. 7, the node 600 may include a transceiver 606, a processor 608, a memory 602, one or more presentation components 604, and at least one antenna 610. The node 600 may also include a Radio Frequency (RF) spectrum band module, a BS communications module, an NW communications module, and a system communications management module, Input/Output (I/O) ports, I/O components, and power supply (not explicitly illustrated in FIG. 7). Each of these components may be in communication with each other, directly or indirectly, over one or more buses 624. In one implementation, the node 600 may be a UE or a BS that performs various functions described herein, for example, with reference to FIGS. 1 through 6.

The transceiver 606 having a transmitter 616 (e.g., transmitting/transmission circuitry) and a receiver 618 (e.g., receiving/reception circuitry) may be configured to transmit and/or receive time and/or frequency resource partitioning information. In one implementation, the transceiver 606 may be configured to transmit in different types of subframes and slots, including, but not limited to, usable, non-usable and flexibly usable subframes and slot formats. The transceiver 606 may be configured to receive data and control channels.

The node 600 may include a variety of computer-readable media. Computer-readable media may be any available media that may be accessed by the node 600 and include both volatile (and non-volatile) media and removable (and non-removable) media. By way of example, and not limitation, computer-readable media may include computer storage media and communication media. Computer storage media may include both volatile (and non-volatile) and removable (and non-removable) media implemented according to any method or technology for storage of information such as computer-readable.

Computer storage media includes RAM, ROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media does not include a propagated data signal. Communication media may typically embody computer-readable instructions, data structures, program modules, or other data in a modulated data signal such as a carrier wave or other transport mechanism and include any information delivery media. The term "modulated data signal" may mean a signal that has one or more of its characteristics set or changed in such a manner as to encode information in the signal. By way of example, and not limitation, communication media may include wired media such as a wired NW or direct-wired connection, and wireless media such as acoustic, RF, infrared and other wireless media. Combinations of any of the above should also be included within the scope of computer-readable media.

The memory 602 may include computer-storage media in the form of volatile and/or non-volatile memory. The memory 602 may be removable, non-removable, or a combination thereof. For example, the memory 602 may include solid-state memory, hard drives, optical-disc drives, etc. As illustrated in FIG. 7, the memory 602 may store computer-readable and/or—executable instructions 614 (e.g., software codes) that are configured to, when executed, cause the processor 608 to perform various functions described herein, for example, with reference to FIGS. 1 through 6. Alternatively, the instructions 614 may not be directly executable by the processor 608 but may be configured to cause the node 600 (e.g., when compiled and executed) to perform various functions described herein.

The processor 608 (e.g., having processing circuitry) may include an intelligent hardware device, a Central Processing Unit (CPU), a microcontroller, an ASIC, etc. The processor 608 may include memory. The processor 608 may process the data 612 and the instructions 614 received from the memory 602, and information through the transceiver 606, the baseband communications module, and/or the NW communications module. The processor 608 may also process information to be sent to the transceiver 606 for transmission through the antenna 610, to the NW communications module for transmission to a CN.

One or more presentation components 604 may present data indications to a person or other device. Examples of presentation components 604 may include a display device, speaker, printing component, vibrating component, etc.

In summary, there are couples of embodiments dealing with the feedback of the SL HARQ-ACK bit(s) via the UP PUCCH resource. Specifically, the solutions may deal with the following issues.

First, to determine the SL HARQ-ACK states when not receiving any signal from the SL feedback channel(s), for both the NACK-only and the ACK/NACK-based feedback in the groupcast scenario.

Second, to determine the SL HARQ-ACK bits to be reported via the UL PUCCH resource(s). Details include how to generate HARQ-ACK bit(s) for the SL TB(s) and how to multiplex the HARQ-ACK bit(s) corresponding to different SL TBs.

Third, the payload information determination when the PUCCH resources for the UL UCI and for the SL HARQ-ACK feedback overlap in the time domain. Details include how to select on the PUCCH resource for transmission when only one is allowed for transmission and how to multiplex the UL UCI and the SL HARQ-ACK information on the selected PUCCH resource.

From the above description, it is manifested that various techniques may be used for implementing the concepts described in the present disclosure without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present disclosure is not limited to the particular implementations described above. Still, many rearrangements, modifications, and substitutions are possible without departing from the scope of the present disclosure.

What is claimed is:

1. A method performed by a User Equipment (UE), the method comprising:
    receiving a current Sidelink (SL) Physical Downlink Control Channel (PDCCH) from a Base Station (BS), wherein the current SL PDCCH provides scheduling information for at least one SL transmission to be transmitted from the UE to at least one other UE;
    obtaining a value of a SL Assignment Indicator (SAI) field from the current SL PDCCH, wherein the value of the SAI field indicates an accumulative number of a set of SL PDCCHs received from the BS up to the current SL PDCCH, the set of SL PDCCHs received from the BS being for scheduling a quantity of SL transmissions and being associated with search space indexes;
    constructing a Hybrid Automatic Repeat reQuest (HARQ) codebook for the quantity of SL transmissions based at least in part on the SAI field and the associated search space indexes; and
    transmitting the HARQ codebook to the BS,
    wherein the quantity of the SL transmissions includes the at least one SL transmission, and the set of SL PDCCHs received from the BS includes the current SL PDCCH.

2. The method of claim 1, wherein the at least one SL transmission corresponds to a Transport Block (TB).

3. The method of claim 1, wherein a plurality of HARQ-ACK bits in the HARQ codebook are processed by a bundling operation and/or a multiplexing operation.

4. The method of claim 1, wherein the at least one SL transmission determines one bit of the HARQ codebook.

5. The method of claim 4, wherein the value of the SAI field in the current SL PDCCH determines an order of the one bit of the HARQ codebook.

6. The method of claim 4, wherein the UE is a SL transmission UE, and the one bit of the HARQ codebook represents an ACK/NACK message indicating whether or not the at least one SL transmission is successfully received by a SL reception UE and/or a SL reception UE group.

7. The method of claim 1, wherein in response to two search space sets being in the same monitoring occasion, constructing the HARQ codebook for the quantity of SL transmissions comprises multiplexing one bit of the HARQ codebook corresponding to a first search space set of the two search space sets with a lower search space index earlier than one bit of the HARQ codebook corresponding to a second search space set of the two search space sets with a higher search space index.

8. A User Equipment (UE) in a wireless communication system comprising a Base Station (BS), the UE comprising:
    a transceiver;
    a memory having computer-executable instructions embodied thereon; and
    at least one processor coupled to the transceiver and the memory, the at least one processor being configured to execute the computer-executable instructions which cause UE to:
        receive, via the transceiver, a current Sidelink (SL) Physical Downlink Control Channel (PDCCH) from a Base Station (BS), wherein the current SL PDCCH provides scheduling information for at least one SL transmission to be transmitted from the UE to at least one other UE;
        obtain a value of a SL Assignment Indicator (SAI) field from the current SL PDCCH, wherein the value of the SAI field indicates an accumulative number of a set of SL PDCCHs received from the BS up to the current SL PDCCH, the set of SL PDCCHs received from the BS being for scheduling a quantity of SL transmissions and being i associated with search space indexes; and p2 construct a Hybrid Automatic Repeat reQuest (HARQ) codebook for the quantity of SL transmissions based at least in part on the SAI field and the associated search space indexes; and
        transmit the HARQ codebook to the BS,
        wherein the quantity of the SL transmissions includes the at least one SL transmission, and the set of SL PDCCHs received from the BS includes the current SL PDCCH.

9. The UE of claim 8, wherein the at least one SL transmission corresponds to a Transport Block (TB).

10. The UE of claim 8, wherein a plurality of HARQ-ACK bits in the HARQ codebook are processed by a bundling operation and/or a multiplexing operation.

11. The UE of claim 8, wherein the at least one SL transmission determines one bit of the HARQ codebook.

12. The UE of claim 11, wherein the value of the SAI field in the current SL PDCCH determines an order of the one bit of the HARQ codebook.

13. The UE of claim 11, wherein the UE is a SL transmission UE, and the one bit of the HARQ codebook represents an ACK/NACK message indicating whether or not the at least one SL transmission is successfully received by a SL reception UE and/or a SL reception UE group.

14. The UE of claim 8, wherein when constructing the HARQ codebook for the quantity of SL transmissions, the computer-executable instructions cause the UE to:
    in response to two search space sets being in the same monitoring occasion, multiplex one bit of the HARQ codebook corresponding to a first search space set of the two search space sets with a lower search space index earlier than one bit of the HARQ codebook corresponding to a second search space set of the two search space sets with a higher search space index.

* * * * *